March 10, 1964 B. STUHL 3,124,304

THERMOSTATIC MIXING VALVE

Filed Dec. 19, 1961

INVENTOR
BRUNO STUHL

By
OSTROLENK, FABER, GERB & SOFFEN
ATTORNEYS

United States Patent Office 3,124,304
Patented Mar. 10, 1964

3,124,304
THERMOSTATIC MIXING VALVE
Bruno Stuhl, Buchs, Aargau, Switzerland, assignor to Aktiengesellschaft Karrer, Weber & Cie, Armaturenfabrik und Metallgiesserei, Unterkulm, Aargau, Switzerland
Filed Dec. 19, 1961, Ser. No. 160,580
1 Claim. (Cl. 236—12)

This invention relates to thermostatic mixing valves of the type used for mixing hot and cold water to a predetermined mixing temperature, and provided with a hot water chamber, a cold water chamber, two mixer component valves, a mixed water chamber and a thermostat, the movable valve parts for the mixer components being spaced a fixed distance apart from each other and operatively connected with a temperature sensitive member.

In known thermostatic mixing valves of the type described, the mixed water chamber is situated between the hot water chamber and the cold water chamber, and is connected with these chambers by means of mixer component valves. As temperature sensitive member a steam pressure indicator is usually employed, the steam chamber of which is situated in the mixed water chamber and the expansible body of which, e.g. a bellows, is disposed outside of the mixed water chamber and connected to the said steam chamber by a conduit, one end of said bellows being retained as base with respect to the housing of the fitting, while the stroke of the bellows is transmitted by means of a connecting rod to the movable valve parts of the mixer components. In order to be able to adjust the thermostat to a desired predetermined temperature, the end of the bellows is formed so as to be adjustable in the direction of stroke with respect to a scale from the outside, e.g. by means of a worm gear.

Since in known thermostatic mixing valves of the type described the expansible body of the temperature sensitive member, e.g. the bellows, is situated outside of the cold water chamber, it assumes essentially the surrounding temperature of the fitting. The thermostat thus becomes dependent on the room temperature and the controlled temperature of the mixed water may deviate more than is admissible from the adjusted rated value. To prevent this condition, it has been proposed already to arrange the expansible body of the temperature sensitive member in the cold water chamber, or to enlarge the cold water chamber so as to surround the bellows. In this manner, the dependence on the surrounding temperature could be avoided, or the dependence on the cold water temperature at least limited, but the calibration of the rated temperature scale with respect to an always present reference temperature, which is a contributory determinant in the stroke variation of the bellows, is not yet possible. Moreover, in the known thermostatic mixing batteries of this kind the mixing temperature can be dependent also on the tapped amount, since one part of the one mixer component valve is arranged adjustable from the outside for changing the tapped amount, for which reason, in case of a change in the tapped amount, the mixing ratio is also changed and the thermostat is caused to effect a readjustment.

It is an object of the present invention to avoid these disadvantages and to provide a thermostatic mixing valve of the kind referred to in which the control of the mixing temperature will be independent of the room temperature, the cold water temperature and also of the tapped amount of water.

A further object of the invention is to obtain this independence by relating the calibration of the predetermined temperature scale to the always present mixing temperature itself. In a thermostatic mixing valve according to the invention, the hot water chamber and the cold water chamber are situated directly side by side and separated by a partition wall, and said wall carrying a fixed valve part which is situated between the movable valve parts of the mixer component valves, the temperature sensitive member being disposed completely within the mixed water chamber, and the rate of discharge from the mixed water chamber being controlled by an outlet valve. According to a further feature of the invention, the movable valve parts of the mixer component valves are formed as cylindrical slides, one of said slides being open at both ends so that the intermingling hot and cold water pass through the slide into the mixed water chamber. The cold and hot water chambers and the two mixer component valves preferably are arranged within a control cylinder insertable as a unit into the housing of the fitting.

The present invention will now be described more fully with reference to the accompanying drawings illustrating, by way of example, several embodiments of the invention, and in which.

Figure 1:
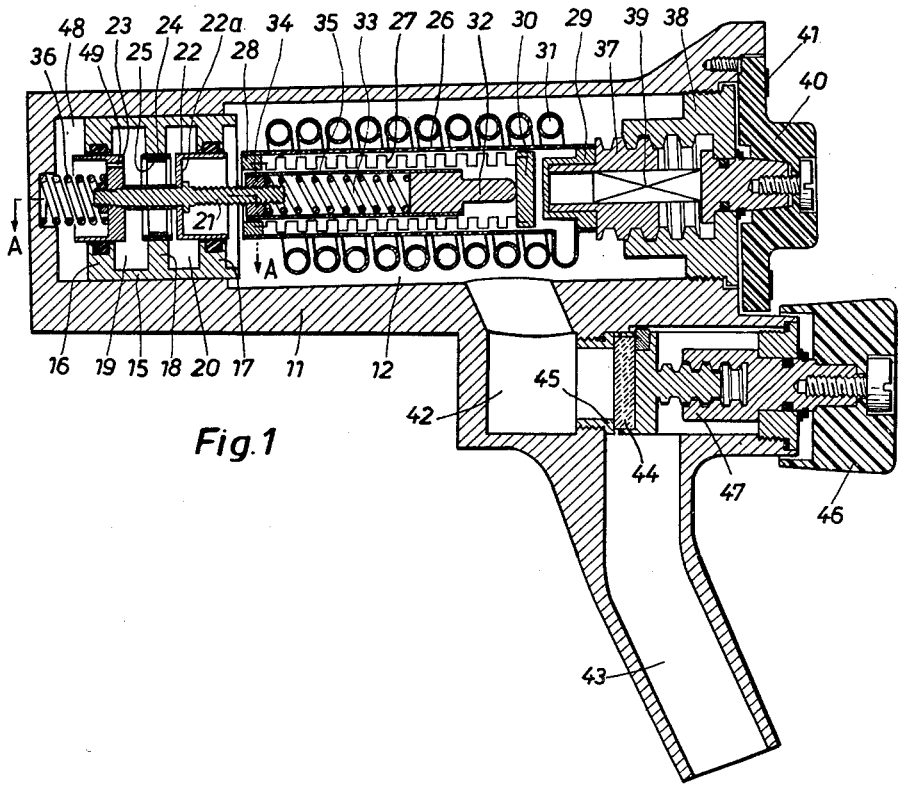
FIGURE 1 is an axial section through a thermostatic mixing valve provided with a mechanical counterforce for the temperature sensitive member.
Figures 2, 3:
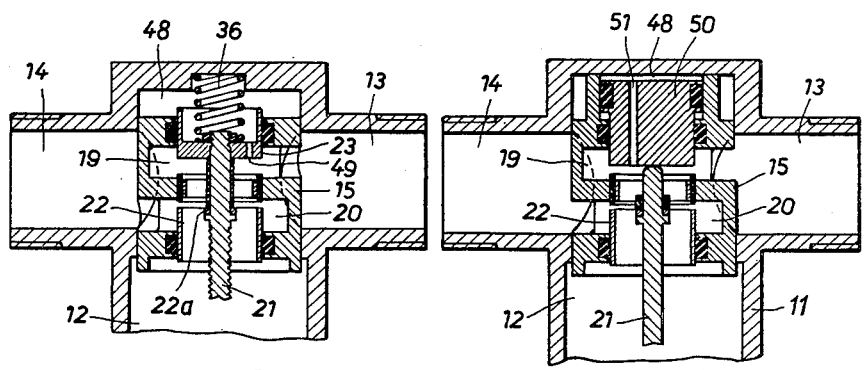
FIGURE 2 is a section on the line A—A of FIGURE 1.
FIGURE 3 shows a form of construction provided with a hydraulic counterforce for the temperature sensitive member.

The thermostatic mixing valve according to FIGURE 1 comprises a housing 11 provided with a cylindrical chamber 12 which is constricted at its rear end portion to a somewhat smaller diameter. This end portion of the housing 11 is provided with a cold water inlet 13 and a hot water inlet 14, as shown in FIGURE 2. Arranged in fixed position in the constricted chamber space is a cylindrical valve body 15 having two end walls 16, 17 and a partition wall 18 which latter divides the interior space into two chambers 19 and 20, the chamber 19 being the cold water chamber communicating with the inlet 13, and the chamber 20 being the hot water chamber communicating with the inlet 14. Two mixing component valves are mounted in the cylinder 15 on an axially movable valve stem 21 which carries two pistons 22, 23 spaced apart for a fixed distance which, however, is adjustable for calibrating purposes. The partition wall 18 supports a fixed valve part having oppositely directed seats for the movable valve pistons 22, 23. The fixed valve part is formed by a ring 24 made of synthetic plastic material, which is forced into the bore of the partition wall by means of a ring 25 which may be elastic or held by pressure in the ring 24. The axial distance between either piston 22, 23 and the corresponding seat on the ring 24 determines the mixing proportion of cold and hot water.

The piston 22 is tubular and has at the side facing the seat a supporting web 22a. Hot water and cold water pass through the piston 22 in a quantitative proportion determined by the valve openings and are mixed within the piston 22, so that the mixed water flowing into the chamber 12 has already obtained the mixing temperature. If required, a sieve may be attached to the open end face of the piston 22, in order to obtain an improved mixing of hot and cold water within the piston.

A temperature responsive member 26, 27 is arranged completely within the mixed water chamber 12. The rate of expansion of the member 26, 27 depends solely on the temperature of the mixed water and determines the valve position by being transmitted to the valve stem 21. The expansible body of the temperature responsive member is formed by a rigid tube 26 and a corrugated tube 27 arranged within the tube 26; this expansible body is closed at one end by a ring 28 which connects the tube 26 with the corrugated tube 27, and at the other end by a nipple 29 as stationary base and a small plate 30 as movable head part. A coiled temperature feeler tube 31 surrounds this expansible body and has its free end closed, while the end remote of the valve body 15 communicates with the interior of the tube 26. The transfer of the expansion onto the valve stem 21 is effected by an abutment 32 and a buffer spring 33 bearing on a threaded nut 34 screwed on the valve stem 21, so that the stem is adjustable in longitudinal direction for purposes of calibration, the buffer spring 33 and the abutment 32 being guided in a tube 35 fastened on the screw nut 34.

The buffer spring 33 is not subjected to any substantial variation in length during the transmission of a movement of expansion of the bellows 27. However, when the hot water valve 22, 24 is closed and the temperature of the mixed water continues to rise, then the bellows will be able to expand further while compressing the buffer spring, whereby inadmissibly high pressure in the temperature responsive member is avoided. The counterforce for resetting the valves when the temperature of the mixed water drops, is mechanically produced by means of a spring 36 provided between the valve piston 23 and the end wall of the housing 11.

For the adjustment of the desired temperature, the temperature responsive member is arranged to be longitudinally movable in the direction of the stroke; for this purpose the nipple 29 is mounted upon a worm 37 which is adjustable by means of a square stem section 39 inserted into the fixed worm nut 38, the stem carrying a rotatable handle 40 having a scale 41.

The mixed water chamber 12 is connected by a duct 42 to a discharge spout 43 and between these two parts an outlet valve for controlling the rate of discharge is provided; the valve comprises a piston 44 and a valve seat 45 and is adjustable for setting the desired rate of discharge by means of a handle 46 and a screw drive 47.

The valve body cylinder 15 with the mix component valves and the counterforce spring 36 is designated as control cylinder, and is inserted as a unit with the temperature sensitive member 26, 27 into the housing, a chamber 48 being formed between the cylinder 15 and the housing end wall, which chamber is connected with the cold water chamber 19 by a capillary orifice 49 to thereby act as counter pressure chamber on the valve piston 23.

The counterforce for resetting the temperature sensitive member 26, 27 when the mixed water temperature drops may also be produced hydraulically by forming the valve piston 50 as differential pressure piston, as illustrated in FIGURE 3. For this purpose the piston 50 is stepped to form a larger diameter facing the pressure chamber 48, and the pressure chamber 48 is connected by a capillary orifice 51 with the cold water chamber 19. In contradistinction to the mechanically produced counterforce which is proportional to the expansion and thus becomes dependent on the mixed water temperature, the hydraulically produced counterforce is independent of expansion and constant for all mixed water temperatures. The counterforce, however, is dependent on the water pressure and during throttling action this force increases, so that when the discharge control valve 44 is closed, the piston 50 in compressing the buffer spring 33 abuts against the valve seat and closes the cold water admission. In this manner, no special non-return valves are required in the supply conduits.

The setting of the mixing valve to a desired mixed water temperature is brought about by rotating the knob 40, whereby the temperature sensitive member is moved by means of the worm gear drive 37, 38, 39 in the direction of expansion and the pistons of the mix component valves are moved into the required opening positions for obtaining the desired mixing temperature. Since the temperature responsive member is completely enclosed in the mixed water, its expansion is dependent solely of the mixed water temperature, and the calibration of the rated temperature scale is related to the mixing temperature. The mixing temperature is regulated to a constant value as long as water is tapped, since the discharge control valve is not connected with a mix component valve. Only when the discharge control valve is completely closed, the housing with the mixed water chamber gradually cools off to the ambient room temperature which no longer conforms to the adjusted rated value. However, when the discharge control valve is opened again, first a too large amount of hot water flows into the mixing chamber and rapidly heats up the latter. Oscillating motions of the thermostat, however, cannot occur since the latter is aperiodically damped by the hydraulic damping of the valve piston of the cold component valve.

I claim:

A thermostatic mixing valve for mixing hot and cold water to a predetermined mixing temperature, comprising means defining a hot water chamber; means defining a cold water chamber, said hot and cold water chambers being adjacently positioned along the axis of said thermostatic mixing valve; a partition wall separating said hot and cold water chambers; means defining a mixed water chamber; a temperature sensitive member arranged completely within said mixed water chamber; a fixed valve member carried by said partition wall; two movable mixed component valve members operatively connected to said temperature sensitive member, said movable valve members having axially separated peripheral edges oppositely located on either side of said partition wall to define a single axial wall opening; said wall opening co-acting with said fixed valve member in response to the temperature of the mixed water for varying the axial extent of said single axial wall opening positioned at either side of said partition wall, thereby controlling the flow of hot and cold water from said hot and cold water chambers to said mixed water chamber; the rate of discharge of water from said mixed water chamber being controlled by an outlet valve; said cold water chamber and said hot water chamber together with said two mixed component valves being arranged within a cylindrical valve body insertable as a unit into a housing of said mixing valve; said cylindrical valve body defining within said housing a counterforce chamber which communicates with said cold water chamber by a capillary orifice; said temperature responsive member producing an axial force in a first direction responsive to temperature rise; the resetting force for said thermostat being hydraulically produced in a direction opposed to said first directional axial force, one of said movable valve members having a larger piston surface on the side of the counterforce chamber than on the opposite side.

References Cited in the file of this patent

UNITED STATES PATENTS

| | | |
|---|---|---|
| 1,195,722 | Powers et al. | Aug. 22, 1916 |
| 1,354,740 | Giesler | Oct. 5, 1920 |
| 1,715,662 | Laskey | June 4, 1929 |
| 1,819,045 | Snediker | Aug. 18, 1931 |
| 1,989,909 | Boydston | Feb. 5, 1935 |
| 2,141,520 | Dube | Dec. 27, 1938 |
| 2,382,283 | Barnett | Aug. 14, 1945 |
| 2,603,420 | Tacchi | July 15, 1952 |
| 2,810,523 | Branson | Oct. 22, 1957 |